US007643496B1

(12) United States Patent
Jamieson et al.

(10) Patent No.: US 7,643,496 B1
(45) Date of Patent: Jan. 5, 2010

(54) APPLICATION SPECIFIED STEERING POLICY IMPLEMENTATION

(75) Inventors: Dwight Jamieson, Ottawa (CA); Bernard St-Denis, Ottawa (CA)

(73) Assignee: Nortel Networks Limited, St. Laurent, Quebec ( * ) Notice: Subject to any disclaimer, the term of this patent is extended or adjusted under 35 U.S.C. 154(b) by 442 days.

(21) Appl. No.: 11/646,693

(22) Filed: Dec. 28, 2006

Related U.S. Application Data

(63) Continuation-in-part of application No. 11/241,612, filed on Sep. 30, 2005.

(51) Int. Cl.
*H04L 12/28* (2006.01)
*H04L 12/56* (2006.01)
*G06F 15/16* (2006.01)

(52) U.S. Cl. .................. 370/400; 709/201; 709/202
(58) Field of Classification Search .......... 370/389, 370/400; 709/201, 202
See application file for complete search history.

(56) References Cited

U.S. PATENT DOCUMENTS

| | | | |
|---|---|---|---|
| 6,539,483 B1 | 3/2003 | Harrison et al. | |
| 6,587,466 B1 | 7/2003 | Bhattacharya et al. | |
| 6,594,268 B1 * | 7/2003 | Aukia et al. | 370/400 |
| 6,598,034 B1 | 7/2003 | Kloth | |
| 7,028,098 B2 | 4/2006 | Mate et al. | |
| 7,162,545 B2 * | 1/2007 | Sudo | 709/201 |
| 7,370,100 B1 | 5/2008 | Gunturu | |
| 7,403,525 B2 | 7/2008 | Sano et al. | |
| 7,424,014 B2 * | 9/2008 | Mattes et al. | 370/389 |
| 2006/0013136 A1 | 1/2006 | Goldschmidt et al. | |
| 2006/0224883 A1 | 10/2006 | Khosravi et al. | |

OTHER PUBLICATIONS

Co-pending related application 11/241,612, including office action dated Aug. 7, 2008 and Office Action dated Jun. 11, 2009.

* cited by examiner

*Primary Examiner*—Ronald Abelson
(74) *Attorney, Agent, or Firm*—Anderson, Gorecki & Manaras

(57) ABSTRACT

A data plane architecture enables IP applications, hosted on any processor within a network element, to define steering policies that may be implemented in the data plane. The steering policies enable the applications to define steering policies containing both attributes and actions. The attributes are used to identify the packets and the actions are used to define how the data plane of the network element should handle the packets. The steering policies are implemented in the data plane of the network element by a data path policy steering process. The data path policy steering process operates to implement steering policies defined by applications to cause IP termination to occur at any processor on the network element or optionally at a processor off the network element.

14 Claims, 2 Drawing Sheets

APPLICATION SPECIFIED STEERING POLICY IMPLEMENTATION

CROSS REFERENCE TO RELATED APPLICATIONS

This application is a Continuation in Part of U.S. patent application Ser. No. 11/241,612, filed Sep. 30, 2005, entitled "Method And Apparatus For Specifying IP Termination In A Network Element", the content of which is hereby incorporated herein by reference.

BACKGROUND

1. Field

This application relates to network elements and, more particularly, to application specified steering policy implementation in a data plane of a network element.

2. Description of the Related Art

Data communication networks may include many switches, routers, and other devices coupled to and configured to pass data to one another. These devices will be referred to herein as "network elements". Data is communicated through the data communication network by passing protocol data units, such as frames, packets, cells, or segments, between the network elements by utilizing one or more communication links. A particular protocol data unit may be handled by multiple network elements and cross multiple communication links as it travels between its source and its destination over the network.

FIG. 1 illustrates one example of a communication network 10. As illustrated in FIG. 1, subscribers 12 access the network 10 by interfacing with one or more Provider Edge (PE) network elements 14. The provider edge network elements collect traffic from multiple subscribers and multiplex the traffic onto the network backbone, which includes multiple Provider (P) network elements 16 connected together. The subscribers 12 thus may obtain access to the network 10 to exchange data with other subscribers, to obtain access to networked resources, or otherwise to take advantage of the communication services provided by the communication network.

The network elements on the communication network, such as subscriber gateways 12, provider edge network elements 14, and provider network elements 16, communicate with each other using predefined sets of rules, referred to herein as protocols. Multiple protocols exist, and are used to define aspects of how the communication network should behave, such as how the network elements should identify each other on the network, the format that the data should take in transit, and how the information should be reconstructed once it reaches its final destination. Examples of several protocols include Asynchronous Transfer Mode (ATM), Frame Relay (FR), Ethernet, Transport Control Protocol (TCP), Internet Protocol (IP), Point-to-Point Protocol (PPP), and Multi-Protocol Label Switching (MPLS), although there are probably more than 100 other protocols as well that may be used to govern aspects of communications taking place over the network.

As networks have increased in size and sophistication, the number of applications required to be supported on a given network element has increased dramatically. The applications generally allow the network element to process control and/or data packets to allow particular protocols to be implemented and services to be provided by the network element. Depending on the particular application, more than one instances of a given application may need to be started on a network element to enable traffic to be segregated or to enable load sharing to be implemented between the processors in the network element.

One way to enable a network element to handle larger numbers of applications is to provide multiple processors in the network element. A large network element may include several processors such as CPUs and Network Processing Units (NPUs), to enable it to handle the load placed on the network element in connection with handling data traffic and in connection with providing network services.

Although multiple processors may enable packets to be processed more efficiently, the use of multiple processors requires the packets to be directed within the network element to the correct processor. Accordingly, it would be advantageous to provide a way to enable applications to specify steering policies, and to provide a way to implement the steering policies in a data plane of a network element.

SUMMARY OF THE DISCLOSURE

Accordingly, it would be advantageous to have an architecture that would enable IP applications to be hosted on any processor within a network element and define steering policies in the data plane that will enable actions to be defined for packets identified by particular applications. According to an embodiment of the invention IP applications are allowed to define steering policies containing both attributes and actions. The attributes are used to identify the packets and the actions are used to define how the network element should handle the packets. The steering policies are implemented in the data plane of the network element by a data path policy steering process. The data path policy steering process operates to implement steering policies defined by applications to cause IP termination to occur at any processor on the network element or optionally at a processor off the network element.

Policies are defined by applications and passed to a steering policy manager that validates the policy. If the policy is valid, the policy is passed to one or more application agents configured to program the steering policy into the data path policy steering process. The data path policy steering process is configured to process packets received by the network element to determine if the packets match one or more steering policies, and if so to cause the action(s) associated with the steering policies to be implemented with respect to those packets.

BRIEF DESCRIPTION OF THE DRAWINGS

Aspects of the present invention are pointed out with particularity in the claims. The following drawings disclose one or more embodiments for purposes of illustration only and are not intended to limit the scope of the invention. In the following drawings, like references indicate similar elements. For purposes of clarity, not every element may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
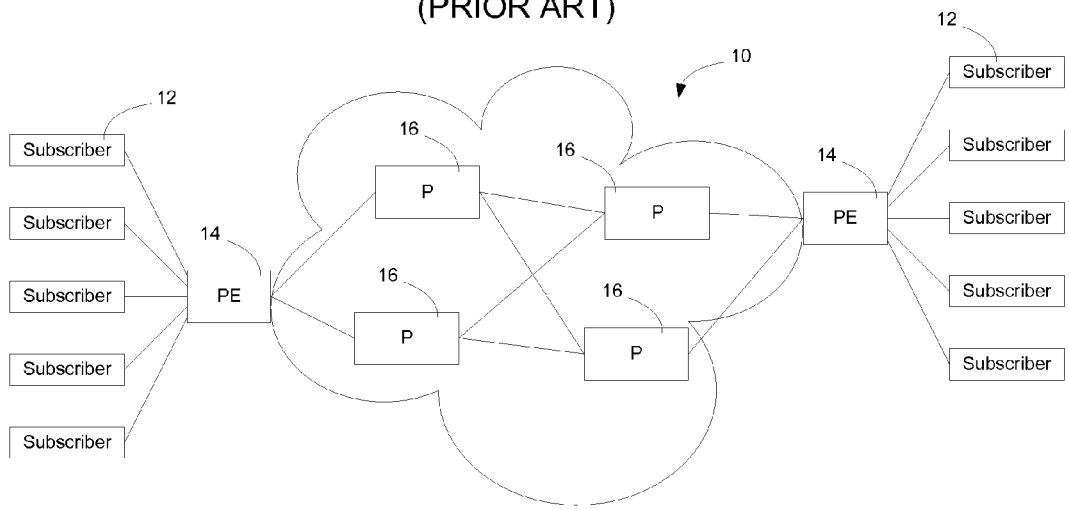
FIG. 1 is a functional block diagram of an example communication network.
Figure 2:
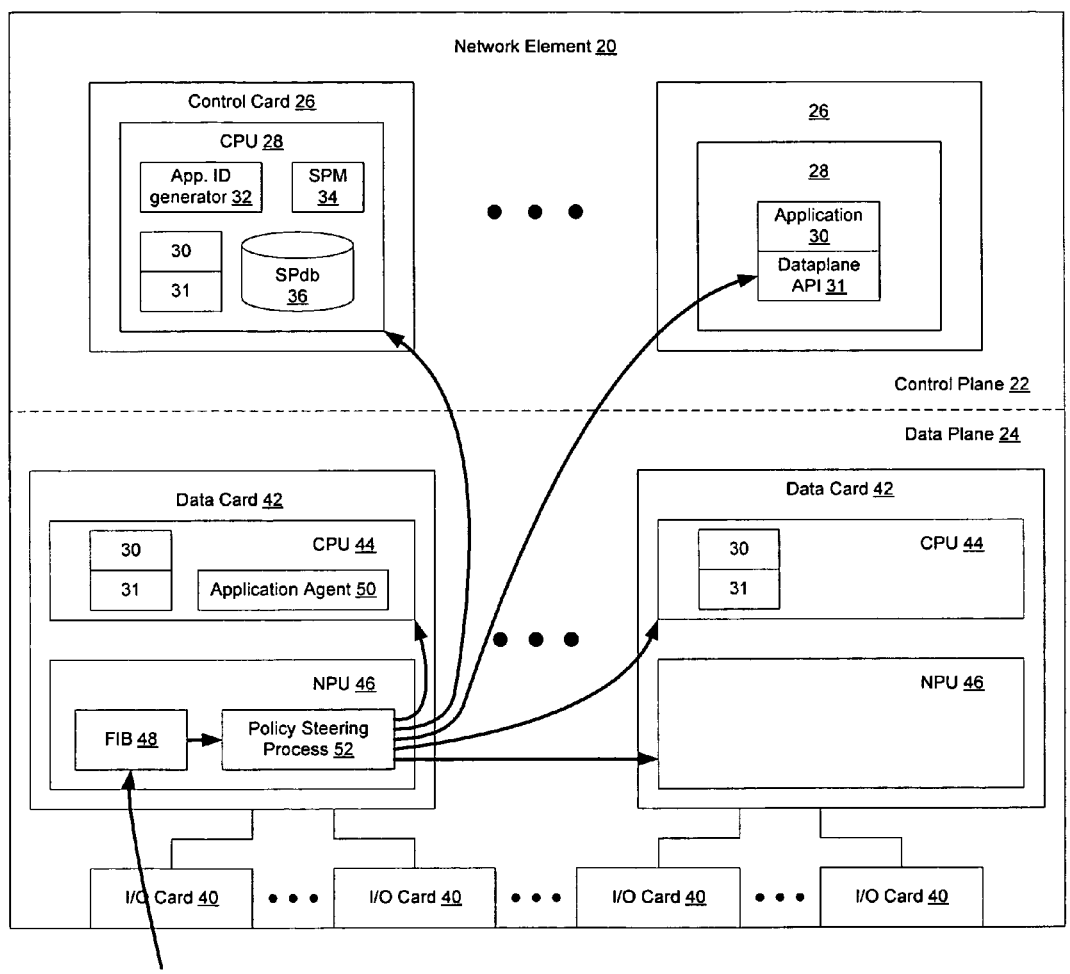
FIG. 2 is a functional block diagram of an example network element according to an embodiment of the invention.

FIG. 2 illustrates one embodiment of a network element 20 according to an embodiment of the invention. Although a description of the structure and methods of operation of the embodiment illustrated in FIG. 2 will be provided herein to enable operation of the invention to be understood, the invention is not limited to this particular network element or a network element having a similar architecture, as the invention may be used in connection with network elements such as routers and switches formed using other alternative architectures. The embodiment shown in FIG. 2 may be used as a subscriber gateway network element 12, provider edge network element 14, provider core network element 16, or as another type of network element, on a communication network such as the communication network 10 described above in connection with FIG. 1. Additionally, the network element shown in FIG. 2 may be implemented as a gateway between different types of networks and is not limited to operation on a single communication network.

In the embodiment shown in FIG. 2, the network element 20 generally includes a control plane 22 and a data plane 24. The control plane 22 is configured to control operation of the network element 20 by specifying how the data plane 24 should handle particular packets or classes of packets. The control plane generally includes control cards 26, each of which includes one or more processors such as a CPU 28. The control cards may be interconnected with each other and with the data plane 24 in a known manner.

The processors 28 may host one or more applications 30, routing entities, and other processes. One or more of the processors 28 may also implement aspects of a steering policy management system discussed in greater detail below. The steering policy management system may include, for example, an application ID generator 32, a steering policy manager 34, and a steering policy database 36, although additional components may be included as well. Additionally, the steering policy management system may be implemented on a single processor as shown, may be distributed across more than one processor, or may be implemented external to network element 20. The invention is not limited to the particular manner in which the steering policy management system is implemented in the control plane. Additional details of how the steering policy management system may be implemented from a control plane perspective are contained in the parent application referenced above, the content of which is hereby incorporated herein by reference.

The network element 20 also includes a data plane 24 configured to handle packets of data on the communication network. The data plane 24 generally includes one or more Input/Output (I/O) cards 40 and one or more data cards 42. The data plane may also include components such as a switch fabric and other such components to enable packets to bet transferred between the cards of the data plane and between the data plane and control plane.

The I/O cards 40 are configured to connect to links in the communications network 10. The I/O cards 40 may include physical interfaces, such as optical ports, electrical ports, wireless ports, infrared ports, or ports configured to communicate with other physical media, as well as configurable logical elements capable of being programmed to implement interface definitions specified by an interface manager. Packets received over the I/O cards 40 are passed to the data cards 42 for processing.

The data cards 42 include one or more processors such as a CPU 44 and a network processing unit 46. The CPU 44 may host applications 30 and other processes on the data card 42. The CPU 44 may also implement an application agent 50 via which steering policies defined by the applications 30 may be passed to the network processing unit 46. The network processing unit 46 may be more optimized to perform network processing on packets of data received via the I/O cards. For example, the network processing unit 46 may implement a process 48 to perform forwarding information base lookups for packets that arrive at the data card 42. According to an embodiment of the invention, a data path policy steering process 52 may be implemented in the network processing unit 46 to enable the data plane to cause actions to be performed for packets matching steering policies defined by the applications 30 and passed to the NPU 46 by the application agent 50.

In the embodiment shown in FIG. 2, an application 30 may be started on one of the CPUs 30 in the control plane 22 or in one of the CPUs 30 in the data plane 24. The application 30, according to an embodiment of the invention, includes a dataplane API 31 configured to enable the application to interface with the dataplane to define steering policies as described in greater detail herein. Upon initiation, the application will interface with an application ID generator 32 via the dataplane API 31, to obtain a unique application ID. The application ID is a globally unique identifier within the network element that will enable steering policies generated by the application to be associated with the application.

Once the application has been assigned an application ID, the application may pass information to the API to cause the API to generate steering policies on behalf of the application that will enable IP packets to be terminated at one or more designated processors (i.e. NPU and/or CPU) within the network element. Additional details about steering policies and a possible way of implementing the steering policies in the data plane are discussed in greater detail below.

Steering policies generated by the dataplane API on behalf of the applications are passed to a steering policy manager 34 which validates the steering policies and causes the policies to be stored in a steering policy database 36. Additional details about how steering policies may be implemented from a control plane perspective are set forth in the parent application referenced above, the content of which is hereby incorporated herein by reference. The invention is not limited to an implementation that is utilized in a VPN context or to an implementation containing all the details described in the parent application, however, as the data plane architecture described in greater detail below may be used in connection with many different control plane architectures.

If the steering policy is valid, the dataplane API 31 will pass the steering policy to one or more application agents on one or more of the CPUs 44. The application agent(s) 50 will pass the steering policy to the NPU 46 to cause the steering policy to be implemented by the data plane policy steering process 52 so that IP packets meeting the attributes specified in the steering policy will be handled as defined by the actions set forth in the steering policy. By allowing the applications to interface with the dataplane API 31, the data plane can operate with any application without requiring the application to be modified as the dataplane is changed, and without requiring the dataplane to be reprogrammed each time a new application is developed to run on the network element.

In operation, the NPU will receive packets, perform a forwarding information base lookup 48, and pass the packets to the policy steering process 52. The policy steering process determines if a particular packet matches one or more policies. If the packet matches a policy, the action specified in the policy will be applied to the packet.

There are many actions that may be applied to a packet. For example, the action may specify that the packet should be dropped. In this instance the steering policy process will drop the packet and not forward it. As another example, the action may specify that the packet should be counted in a particular way, in which case one or more counters will be incremented/decremented accordingly. As yet another example, the action may specify that the packet should be directed to particular destination such as a particular CPU, NPU or a set of CPUs and/or NPUs, or should be load-spread to a set of CPUs, NPUs, and/or a set of CPUs and NPUs. The destination, in this instance, may be one or more of the CPUs in the control plane, one or more CPUs in the data plane, one or more CPUs in both the control and data plane, and/or one or more NPUs in the data plane. The destination may also be a network interface which will allow the packet to be passed outside of the box for further processing. As still yet another example, the action may specify that further processing should be performed on the packet on a process established on the NPU that is implementing the policy steering process. Many different actions may be specified and the invention is not limited to only these several described example actions.

The action may include forwarding the packets to the application that generated the steering policy, however the action does not necessarily need to require the packet to be terminated at the processor hosting the application that generated the policy. Thus, for example, an application may generate a policy that specifies that particular packets should be directed to another process for further processing. In this manner processing of packets may be implemented within the data plane, while allowing applications resident in the control plane to specify how packets with particular attributes should be handled by the data plane.

Applications may create policies via the dataplane API 31 containing both attributes and actions. The policies may specify filtering criteria (attributes) relevant to layers 2, 3, 4, and/or 5, and may specify an action to be taken on the packets matching those criteria. The attributes may be specific or may contain wild-card values. For example a policy may specify a particular source address (SA) and use a wildcard for the destination address (DA). In this instance, the policy will apply to all packets originating at the source address regardless of destination address. Where multiple attributes are set, only an exact match will result in the policy action. Where no policy is specified, the network element will continue to terminate the IP flows in a normal manner or in a default manner, which may be specified by a management application interfaced to the network element or instantiated on one or more of the processors described herein.

According to an embodiment of the invention, the policy steering process maintains a database of steering policies based on destination IP address. All steering policies associated with a particular destination IP address are stored together in the steering policy database. When a packet is received, policy steering process will inspect the packet to determine the destination IP address and determine if any steering policies apply to the packet. If one policy applies, the action associated with that policy will be applied to the packet. If more than one policy applies, the packet will be inspected to determine if other attributes of the packet may be used to select from the applicable policies.

Figure 3:
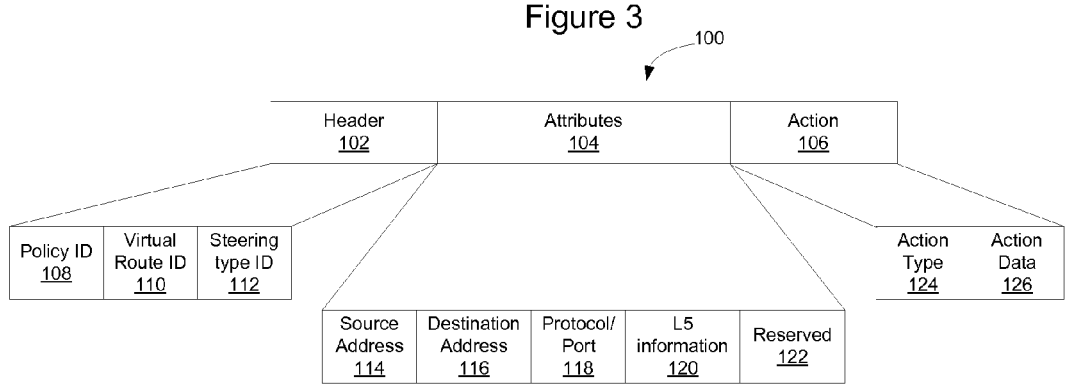
FIG. 3 is a functional block diagram illustrating an example policy format according to an embodiment of the invention.

FIG. 3 illustrates one example of a policy format that may be used in connection with embodiments of the invention. The steering policy format may be determined according to the particular implementation and the invention is not limited to any particular steering policy format.

In the embodiment shown in FIG. 3, the steering policy 100 includes a header 102, one or more attribute fields 104, and one or more action fields 106. Other fields may be included in a steering policy as well and the invention is not limited to the example steering policy illustrated in FIG. 3.

The header 102 may contain information configured to enable the steering policy to be identified within the network element. For example, the header may contain a policy identifier field 108, an optional virtual route identifier field 110, and a steering type identifier 112 field. Other fields may be included in the header as well and the invention is not limited to a header that contains this particular information.

The policy identifier field may contain a policy ID that is globally unique within the network element. For example, as described above, each application is provided with an application ID when instantiated on a processor so that steering policies associated with that application may be identified on the network element. The policy ID may be formed by concatenating the globally unique application ID (which is unique within the network element) with a policy instance number generated by the application and specified as a unique number to that application. Alternatively, a policy ID generator may generate unique policy IDs and distribute the unique policy IDs to the applications in batches to be assigned by the applications as necessary. Other ways of generating policy IDs are possible as well and the invention is not limited to any particular way of generating unique policy IDs.

The virtual route ID field may be used where the policy is associated with a virtual routing entity, for example where the policy is associated with a particular Virtual Private Network. Use of virtual route ID field in this instance may enable policies associated with particular VPNs to be identified quickly and thus may help from a management standpoint. The invention is not limited to an embodiment that is configured to use a virtual router ID field.

The steering type ID field is configured to be used to specify whether the steering policy is relevant to control or data traffic. Other information may be included in the header as well and the invention is thus not limited to an embodiment that uses this particular header format.

The steering policy 100 may also include one or more attribute fields 104 that may be used by the network element to identify the packets. For example, the steering policy may have one or more fields configured to contain source address 114, destination address 116, protocol and port information 118, and one or more fields configured to contain layer 5 information 118 such as tunnel IDs. Other sets of attribute information may be used to identify classes of packets as well, such as protocol, source IP address, source port, destination IP address, and destination port fields. Thus, the invention is not limited to the use of a particular set of fields as many different types of attributes may be used. Similarly, the attribute information fields 104 may enable other information to be specified as well via reserved fields 120 and the invention is not limited to an implementation that uses this particular format for specifying the policy attributes.

The steering policy may also include a set of one or more action fields 106 to be specified for the steering policy. The action portion 106 of the steering policy 100 in the illustrated embodiment includes three fields, an action type field 124, and an action data field 126. The action type may indicate whether the action will be for the network element to drop the packet, forward the packet, log the packet, or take another type of action in connection with the packet.

The action data field 126 may contain information indicating how the packet should be logged, where the packet should be forwarded, whether additional processing should occur in connection with the packet, the type of additional processing, and any other desired information that will enable the policy steering process to cause the packet to be forwarded to the correct processor and cause the correct actions to be taken in connection with that packet. For example if the action type field 124 indicates that the packet should be forwarded, the action data field 126 may contain one or more addresses within or outside of the network element where the packet should be forwarded. The address may indicate a particular CPU/NPU, a set of CPUs/NPUs, the application that generated the policy, another application that will perform additional processing on the packet, or may be an address off the network element such as an interface address indicating an interface over which the packet should be forwarded. The action data field may also contain more than one address or a multicast address that will cause the packet to be sent to multiple processors in/off the network element which may process the packet in parallel.

The parent application includes examples of steering policies that may be used in connection with an embodiment of the invention, as well as a way for the control plane to validate steering policies and to store steering policies in a table format. Embodiments of the invention may be implemented using some of these details or, alternatively, other ways of validating steering policies and storing steering policies from a control perspective may be implemented. The invention is thus not limited to the particular details set forth in the parent application and is not limited by the particular manner in which the control plane determines which steering policies are valid and determines how to control operation of the network element to prevent different applications from generating mutually exclusive steering policies.

It should be understood that all functional statements made herein describing the functions to be performed by the methods of the invention may be performed by software programs implemented utilizing subroutines and other programming techniques known to those of ordinary skill in the art. Alternatively, these functions may be implemented in hardware, firmware, or a combination of hardware, software, and firmware. The invention is thus not limited to a particular implementation.

The functional/logical entities described herein may be embodied as one or more software programs implemented in control logic on a processor on the network element 20. The control logic in this embodiment may be implemented as a set of program instructions that are stored in a computer readable memory within the network element and executed on a microprocessor on the network element. However, in this embodiment as with the previous embodiments, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described herein may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A network element, comprising:
 a plurality of data cards, each data card including at least one Network Processing Unit (NPU) configured to handle packet traffic on the network element; and
 at least one Central Processing Unit (CPU) containing control logic configured to implement an application process, the application process being configured to generate steering policies defining how the network element should process a subset of the packet traffic on the network element;
 wherein the NPU contains control logic configured to implement a policy steering process to implement the steering policies, the policy steering process being configured to enable packets associated with the subset to be directed to one or more of the CPUs and/or NPUs for further processing; and
 wherein the data card further comprises a second CPU containing control logic configured to implement an application agent, the application agent being configured to program the steering policies into the NPU.

2. The network element of claim 1, wherein the CPU further comprises a dataplane API configured to interface between the application and the data card to provide a standard interface between the application and the data card.

3. The network element of claim 1, wherein the NPU further contains control logic configured to implement a forwarding information base via which the NPU may perform forwarding lookups on packets received by the network element.

4. The network element of claim 3, wherein the network element is configured to implement the forwarding information base lookup before the policy steering process is used to direct the packets.

5. The network element of claim 1, wherein the CPU is on the data card.

6. A network element, comprising:
 a plurality of data cards, each data card including at least one Network Processing Unit (NPU) configured to handle packet traffic on the network element; and
 at least one Central Processing Unit (CPU) containing control logic configured to implement an application process, the application process being configured to generate steering policies defining how the network element should process a subset of the packet traffic on the network element;
 wherein the NPU contains control logic configured to implement a policy steering process to implement the steering policies the policy steering process being configured to enable packets associated with the subset to be directed to one or more of the CPUs and/or NPUs for further processing, wherein the application is on a first CPU, and wherein the policy steering process is configured to enable packets associated with the subset to be directed to a second CPU.

7. A network element, comprising:
 a plurality of data cards, each data card including at least one Network Processing Unit (NPU) configured to handle packet traffic on the network element; and at least one Central Processing Unit (CPU) containing control logic configured to implement an application process, the application process being configured to generate steering policies defining how the network element should process a subset of the packet traffic on the network element;

wherein the NPU contains control logic configured to implement a policy steering process to implement the steering policies, the policy steering process being configured to enable packets associated with the subset to be directed to one or more of the CPUs and/or NPUs for further processing, wherein the network element further comprises a plurality of control cards, at least one of the control cards including at least one of the CPUs and a dataplane Application Programming Interface (API) configured to provide an interface between the application and a dataplane, the dataplane including the NPU.

8. A method of implementing steering policies on a network element, the method comprising the steps of:

receiving, by the network element, a packet;

passing the packet to a forwarding information base process to perform a forwarding information base lookup for the packet to receive forwarding information associated with the packet;

passing the packet to a policy steering process to perform policy based forwarding of the packet within the network element, the policy steering process enabling applications instantiated on the network element to specify termination rules for classes of packets; and routing the packet according to an application specific policy steering process associated with the packet;

wherein the step of routing the packet causes the packet to be terminated at a processor that was designated by an application, and wherein the application is not resident on the processor.

9. The method of claim 8, wherein the step of routing the packet occurs within the network element.

10. The method of claim 8, wherein the application is instantiated on a control processor.

11. The method of claim 10, wherein the application is instantiated on a processor not resident on the on the network element.

12. The method of claim 8, wherein the step of routing the packet comprises transmitting the packet to a process instantiated outside of the network element for further processing.

13. The method of claim 8, wherein the step of passing the packet to a policy steering process occurs after the step of passing the packet to a forwarding information base process.

14. A method of implementing steering policies on a network element, the method comprising the steps of:

receiving, by the network element, a packet;

passing the packet to a forwarding information base process to perform a forwarding information base lookup for the packet to receive forwarding information associated with the packet;

passing the packet to a policy steering process to perform policy based forwarding of the packet within the network element, the policy steering process enabling applications instantiated on the network element to specify termination rules for classes of packets; and routing the packet according to an application specific policy steering process associated with the packet; and defining a steering policy by an application, and passing the steering policy via a data plane application programming interface to the policy steering process.

* * * * *

UNITED STATES PATENT AND TRADEMARK OFFICE
CERTIFICATE OF CORRECTION

PATENT NO. : 7,643,496 B1
APPLICATION NO. : 11/646693
DATED : January 5, 2010
INVENTOR(S) : Jamieson et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 450 days.

Signed and Sealed this

Sixteenth Day of November, 2010

David J. Kappos
*Director of the United States Patent and Trademark Office*